United States Patent [19]

Hastings

[11] Patent Number: 4,771,356

[45] Date of Patent: Sep. 13, 1988

[54] METHOD AND APPARATUS FOR ACCOMMODATING POWER DISTURBANCES

[75] Inventor: Steven D. Hastings, Riverside, Calif.

[73] Assignee: The Toro Company, Minneapolis, Minn.

[21] Appl. No.: 10,254

[22] Filed: Feb. 2, 1987

[51] Int. Cl.⁴ ............................................. H02H 3/00
[52] U.S. Cl. ..................................... 361/59; 323/299; 323/300; 361/86
[58] Field of Search ................. 323/299, 300; 361/59, 361/60, 61, 86, 92, 111; 364/184, 187

[56] References Cited

U.S. PATENT DOCUMENTS

| | | | |
|---|---|---|---|
| 3,772,568 | 11/1973 | Phillips | 361/59 |
| 3,921,058 | 11/1975 | Tanaka et al. | 323/300 |
| 3,940,663 | 2/1976 | Meier et al. | 361/59 X |
| 4,644,137 | 2/1987 | Asahi et al. | 361/59 X |

Primary Examiner—A. D. Pellinen
Assistant Examiner—Jeffrey A. Gaffin
Attorney, Agent, or Firm—R. Lawrence Buckley

[57] ABSTRACT

An irrigation system (10) including a microcomputer (12) and a delay apparatus (16). A preferred delay apparatus (16) includes a power detection circuit (20) capable of detecting short-term disturbances in the power being supplied to the microcomputer (12). Delay apparatus (16) also preferably includes a timer circuit (22) which, when power detection circuit (20) detects a short-term disturbance, acts with a switch (24) to interrupt the AC power to the microcomputer (12) for a preselected period of time. The timer circuit (22) can produce a delay of approximately five or six seconds which is suitable for causing microcomputer (12) to restart or reboot, rather than lock-up or otherwise suffer a corruption of data were the momentary power disturbance to reach microcomputer (12).

13 Claims, 2 Drawing Sheets

METHOD AND APPARATUS FOR ACCOMMODATING POWER DISTURBANCES

TECHNICAL FIELD

The present invention relates generally to electronic devices and power supplies for same. The invention pertains more particularly to methods and apparatus for alleviating, in computer devices, problems associated with transient power irregularities or disturbances, e.g. momentary power loss.

BACKGROUND OF THE INVENTION

Most electronic devices, including computers and computerized devices, are supplied electrical power by a remote alternating current (AC) generator, and typically share a power line with a large number of other devices. Community power supplies and transmission systems are subject to disturbances (variations or interruptions) which can detrimentally affect the operation of the devices connected thereto. The present invention is directed toward methods and apparatus for accommodating power disturbances, and particularly momentary power outages.

Community or shared power lines can suffer from a wide assortment of long-term and short-term or transient problems. For AC power systems, there can be variations in the frequency and/or amplitude. Though the former is usually acceptably stable, surges (fairly long-term amplitude variations) and spikes (short-term variations) can occur on a regular basis. Unfortunately, there may even be periods where power is lost altogether. Such problems can be attributed to the power generator or to the transmission system. Environmental conditions e.g. lightning storms, can cause power surges, spikes and/or outages. Further, problems can be caused by the end users themselves by making sudden substantial demands on the power system, by, for example, activating or deactivating large motors, relays, and the like.

Most spikes and surges can be readily accommodated through the use of fuses, circuit breakers and filters of various types. Fuses and circuit breakers are designed to handle over-current conditions by interrupting power to the load device, and must be generally manually reset or replaced. Filters, on the other hand, prevent disturbances from reaching the load device but do not "blow" or "trip", and thus do not need to be manually re-established. One type of filter uses metal oxide varistors to regulate or clamp the AC voltage. Traditional capacitors and RC networks have also been used to filter transients. Some electronic devices are supplied with power back-up systems which are designed to maintain a continuous supply of power to the device in the event of a power outage. Such back-up systems can be quite expensive. Thus, at least for some electronic devices, momentary power outages pose a significant problem. As discussed below, computer devices are particularly sensitive to momentary power outages, and the present invention addresses this problem.

While all electronic devices can be detrimentally affected by power disturbances to some degree, computer devices (computers and devices and systems including computers) are particularly sensitive to power supply problems. Storage or memory components within such devices are typically volatile. Also, timing is critical in computer devices. Finally, given the tens if not hundreds of thousands of logic gates in a typical computer, and given the critical nature of the data and computations handled by such devices, any power irregularities are undesirable. Thus, although the present invention is applicable to a wide variety of electronic devices, for the sake of brevity the following discussion will focus on computers and computerized systems and devices.

Computers and computerized devices and systems are affected by power disturbances (e.g., momentary power outages) in several ways, depending on, among other things, the sophistication of the computer's internal power supply; the presence or absence of a power back-up system; and the nature of the disturbance. Random access memory (RAM) is particularly sensitive to power disturbances, potentially responding by corrupting the logic and/or data contained within the machine. This "corruption" can result from loss of or change in the information stored in RAM. Another problem which can result is a complete lock-up or freeze of the machine wherein the processor is incapable of executing instructions.

Data or logic corruption and/or machine freeze-up are particularly troublesome when the computer or computerized device is operated in an unattended mode. This is because there is no machine operator present to detect and correct such problems. Since most computers are capable of restarting or rebooting themselves in response to a fairly long-term (e.g. five seconds or more) power outage, but are incapable of handling a shorter term power outages, unattended operation is unreliable when momentary power outages are anticipated.

An example of an unattended computerized system is an irrigation system wherein a microcomputer is used to control a large number of valves, pumps and the like. If power to the microcomputer is interrupted for less than about 0.5 second, capacitors within the computer's own power supply circuit are capable of "smoothing" the loss of power and preventing any loss of data or freeze-up. Also, if the power loss lasts for a relatively long period of time (e.g.. five or six seconds) the computer will simply restart itself or "reboot" once power is resumed. The computer then simply determines the status of matters by reading a clock, polling humidity sensors and the like, and then activates the electromechanical devices as necessary. By contrast, if the power loss lasts for more than about 0.5 second. but less than perhaps five or six seconds, the results can be disastrous: the control computer can freeze or lock-up, or have its program or data corrupted, and thus be rendered incapable of properly controlling the valves and pumps of the system.

Short-term power loss to computer devices can be problematical even in attended settings. It is possible that such a power loss could cause a corruption in the data or logic which would not be detected by the operator. It would thus be advantageous, even in some attended operations, to completely remove power from the computer for a period of time to allow the machine to reboot with a valid set of data and instructions. Although this might require the operator to reenter data, it might be preferable in some circumstances where the data is quite critical and the reentry time is not too onerous.

The present invention addresses the problems discussed above. In particular, the invention addresses the problem of short-term power disturbances, e.g. short-term power loss, in the AC electrical supply for computer devices.

SUMMARY OF THE INVENTION

Accordingly, in broad terms one embodiment of the invention is a delay apparatus suitable for connecting between a computer device and its power supply, including:

(a) means for detecting a momentary power loss in the electrical power being supplied to the computer device and producing a power disturbance signal in response thereto; and (b) means responsive to the power disturbance signal for interrupting the electrical power being supplied to the computer device for a preselected period of time, whereby the computer device is not subjected to power disturbances of shorter duration than the preselected period of time.

The delay apparatus therefore takes a "disturbance" of any duration and converts or expands this disturbance into a power interruption to the computer device for a preselected period of time. Thus, for example, if the "disturbance" is a momentary power loss, the delay apparatus will, in effect, convert the momentary power loss into a power loss lasting at least the preselected period of time. Thus, the computer device is allowed to restart or reboot itself and will not be subjected to the potentially harmful short-term disturbance.

The "interrupting means" mentioned above preferably includes switch means having an open state and a closed state and timing means operatively connected to the switch means and responsive to the power disturbance signal (produced by the "detecting means") for maintaining the switch means in its open state for the preselected period of time. When the electrical power being supplied to the computer device is AC, the "switch means" can include a triac.

Particularly when the electrical power being supplied to the computer device is AC, the detecting means can include means for producing a pulse signal for each half wave of the AC power signal supplied to the delay apparatus, and this pulse means can be connected to a charge storage means, wherein when a momentary loss of AC power occurs, for example, the pulse signal producing means will not produce pulse signals and the charge on the charge storage means will change, thereby affecting the power disturbance signal or causing it to change state. The "charge storage means" can include a pulse accumulating capacitor and the "detecting means" can further include a transistor in operative contact with the pulse accumulating capacitor, wherein the conductive state of the transistor changes when the pulse accumulating capacitor is not supplied with a continuous series of pulses, and wherein the conductive state of the transistor affects the state or production of the power disturbance signal.

The "timing means" which determines the length of the preselected period of time during which power is interrupted to the computer device can include a timing capacitor in operative contact with the transistor discussed above, wherein the charge on the timing capacitor begins to change when the transistor changes state, and when the charge on the timing capacitor reaches a predetermined level the power disturbance signal is produced. An integrated timing device can be placed in operative contact with the timing capacitor for monitoring the level of the charge on the timing capacitor and for producing or removing the power disturbance signal depending on the level of charge on the timing capacitor.

The delay apparatus can also include a circuit breaker and a filter suitable for providing over-current, noise and spike protection.

In a preferred embodiment, The delay apparatus discussed above is incorporated into an irrigation system. When the delay apparatus detects that the computer within the irrigation system is about to be subjected to a momentary power loss, the delay apparatus converts the momentary power loss to a power loss having at least the preselected duration, whereby the computer device within the irrigation system will not lock-up or otherwise be detrimentally affected, but will instead be allowed to restart itself following resumption of power to the delay apparatus and the preselected period of time.

Finally. the invention broadly includes a method for preventing a computer device from experiencing a short-term disturbance in its electrical supply comprising:

(a) monitoring the electrical supply;

(b) producing a power disturbance signal when the short-term interruption is detected; and (c) responding to the power disturbance signal by immediately interrupting the electrical computer device for a preselected period of time, whereby the computer device is not subjected to the short-term interruption but instead experiences a loss of power lasting at least the preselected period of time.

BRIEF DESCRIPTION OF THE DRAWINGS

The invention will be further described with reference to the appended Drawings, wherein.

DETAILED DESCRIPTION OF THE INVENTION

Figure 1:
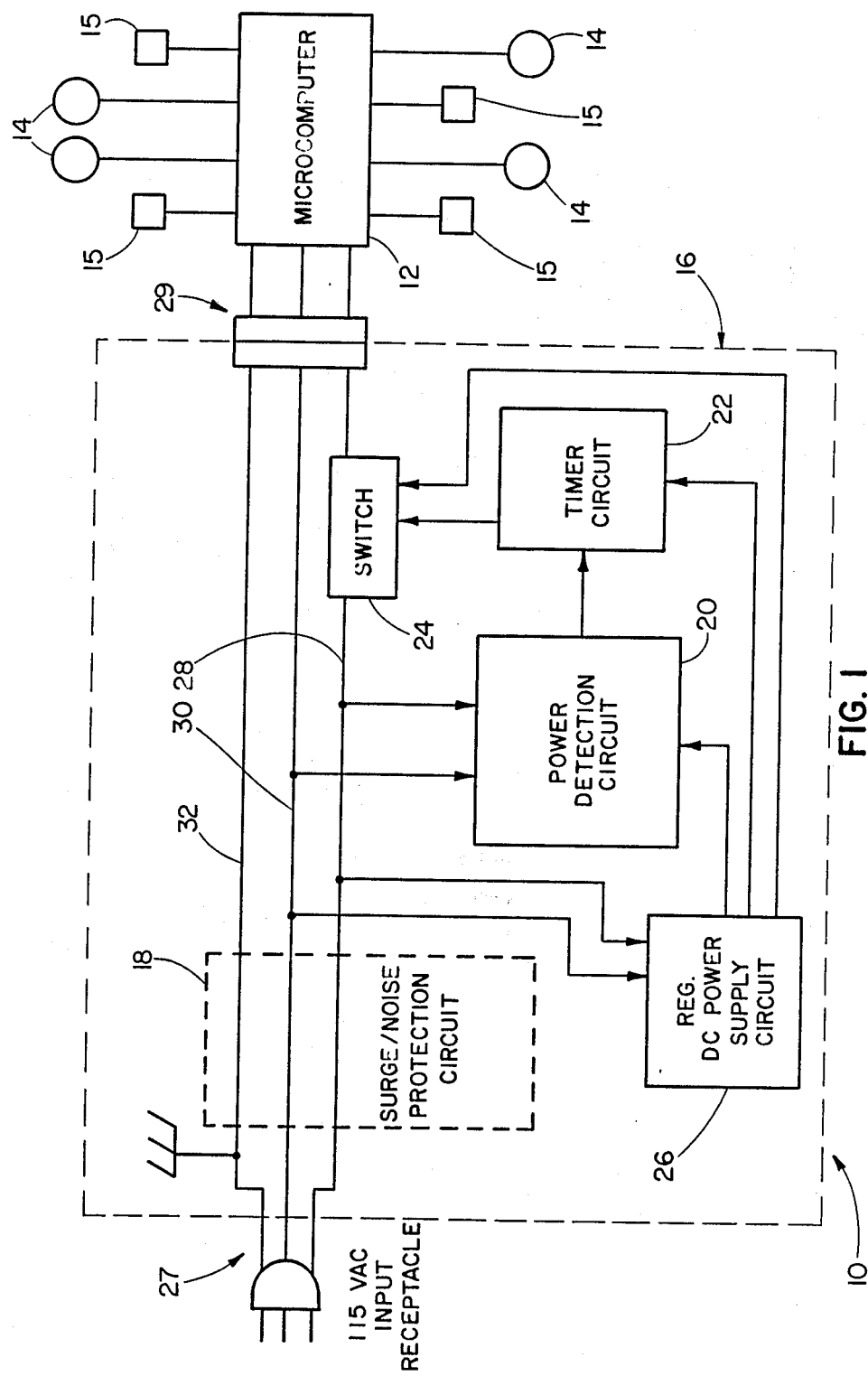
FIG. 1 is a block diagram of a computerized irrigation system including a delay unit according to the invention.

In the Drawings, wherein like reference numerals designate like parts and assemblies throughout the several views, FIG. 1 shows a block diagram of an irrigation system 10 constructed according to the invention. Irrigation system 10 preferably includes a microcomputer 12 which controls a variety of electromechanical devices 14 such as valves, pumps and the like. One such system is the VT3 ® Video Central Irrigation Controller manufactured and distributed by The Toro Company, this system being described in the Toro brochure entitled "Pen-Point Control", Form No. 490-2064, copyright 1984. Microcomputer 12 also typically includes an internal battery-backed-up clock and, optionally, receives information from a plurality of humidity sensors 15. Then, depending on the time of day, soil or air moisture level, and the program selected by the user, microcomputer 12 periodically actuates devices 14 to effect the proper watering sequence and duration for each irrigated area. Prior art irrigation system controllers would typically be connected directly to a 115 VAC line or, perhaps, connected to a 115 VAC line through a surge and noise filter. In the present invention, however, microcomputer 12 is connected to a delay unit 16, the preferred structure and function of which will he described below.

Delay unit 16 preferably includes the following five circuit components: a surge/noise protection circuit 18; power detection circuit 20; timer circuit 22; switch circuit 24; and regulated DC power supply 26. Surge/noise protection circuit 18, in operative contact with hot AC lines 28 and 30 and ground line 32, is disposed between input and output ports or plugs 27 and 29, respectively, of the delay unit 16. Surge/noise protection circuit 18 serves to remove noise, including spikes and surges, in the AC power supplied to computer 12, and thus provides over-current protection.

Power detection circuit 20 is operatively connected or coupled to the hot wires 28 and 30 and in effect monitors incoming power to determine whether there has been a power loss of a duration sufficient to detrimentally affect the performance of microcomputer 12. When such a power loss is detected, power detection circuit 20 provides a "power disturbance signal" which triggers operation of other components of delay circuit 16. It should be noted that delay unit 16 could be designed to accommodate a large variety of power disturbances, including but not limited to power outages. Thus, for example, it might be advantageous to temporarily interrupt power to computer 12 in the event of a surge, rather than to open the circuit using a fuse or circuit breaker and to manually reapply power following the disturbance. Momentary power outages are particularly troublesome, however, because they can corrupt data or completely lock-up a computer, and therefore the remaining discussion will focus on this type of power disturbance.

Timer circuit 22 is connected to power detection circuit 20 and is responsive to the "power disturbance signal" provided by detection circuit 20. Timer circuit 22, as further described below, responds to a momentary power loss, as detected by circuit 20, by converting such short-term power loss to a long-term power loss to computer 12 to cause computer 12 to restart or reboot.

Switch 24 is located in hot line 28 and operates in response to signals from timer circuit 22. In the event of a short-term power loss, switch 24 interrupts power to microcomputer 12 for a relatively long predetermined period of time (e.g., five or six seconds) to cause microcomputer 12 to restart or reboot.

Finally, regulator circuit 26 is coupled to lines 28 and 30 and provides regulated DC power to power detection circuit 20; timer circuit 22; and switch 24.

Figure 2:
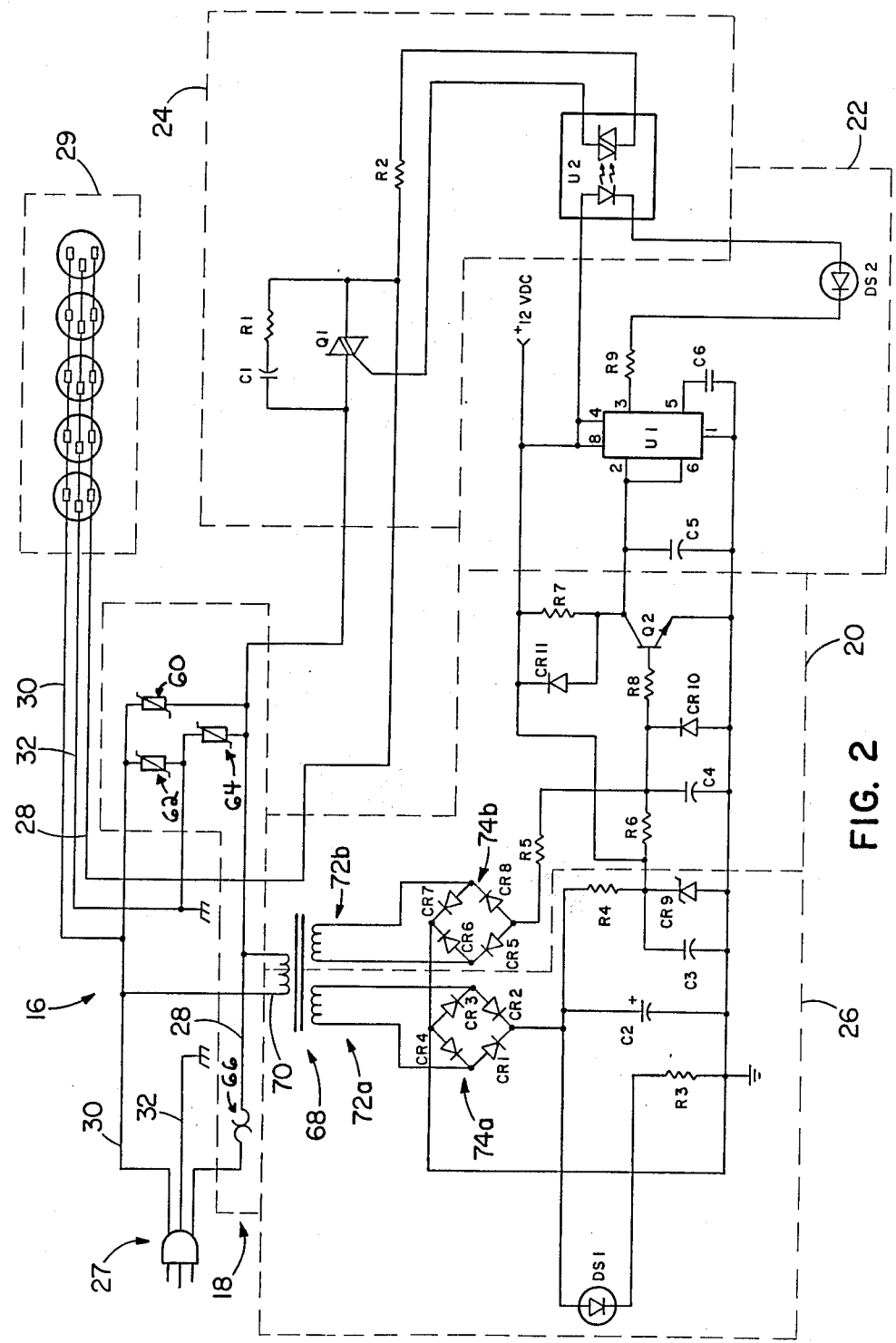
FIG. 2 is a schematic of a preferred delay unit which could be used in the system shown in FIG. 1.

FIG. 2 shows a detailed schematic of delay unit 16. The basic circuit components (circuits 18, 20, 22, 24 and 26) of delay unit 16 are set out in dashed line in FIG. 2 to facilitate understanding of the circuit, but it will be recognized that many of the components of delay unit 16 may serve multiple functions and the delineated circuit is presented only to assist the reader's understanding of the preferred circuit 16. Each of the basic circuit blocks can now be described.

The surge protection circuit 18, disposed between the inlet plug 27 and the outlet plug 29 of delay unit 16, includes means for providing AC noise and spike protection. Such means preferably includes a metal oxide varistor (MOV) 60 connected between hot lines 28 and 30; a MOV 62 connected between line 30 and ground line 32; and a MOV 64 connected between line 28 and ground line 32. Preferably. MOV's 60, 62 and 64 are rated at 130 volts. One type of suitable of MOV is sold by General Electric under the designation V130LA20B.

AC output over-current protection is achieved by a fast-acting, magnetically-actuated circuit breaker 66 in line 28. Circuit breaker 66 protects microcomputer 12 from excessive current and also protects the load switching circuit within delay unit 16 from overloads.

As noted above, power detection circuit 20 and regulated power supply 26 are coupled to the AC lines 28 and 30. Such coupling is indirectly achieved by means of a transformer 68. Transformer 68 has its primary coil 70 connected across lines 28 and 30 and a pair of secondary coils 72a and 72b inductively coupled thereto. Secondary coils 72a and 72b are in turn connected to a pair of full wave rectifiers 74a and 74b. respectively. Secondary coil 72b and full wave rectifier 74b combine to provide negative pulses to the remainder of detection circuit 20, whereas coil 72a and full wave rectifier 74a provide fully rectified power to the remaining components of DC power regulator circuit 26 which in turn supplies power to the detection, timer and switch circuits 20, 22 and 24.

Full wave rectifier 74a, preferably sold by Motorola under the designation IN4002, preferably includes a pair of diodes CR3 and CR4 having common p regions and diodes CR1 and CR2 having common n regions; wherein the n regions of diodes CR3 and CR4 are respectively connected to the p regions of diodes CR2 and CR1; and wherein secondary coil 72a is connected across the common points between diodes CR4 and CR1, and CR3 and CR2. Thus, a fully rectified signal is produced at the common n region of diodes CR1 and CR2, and this point is connected to one side of a capacitor C2 whereas the other side of capacitor C2 is connected to the common p region of diodes CR3 and CR4. In parallel with capacitor C2 are a resistor R4 and a capacitor C3, connected in series, and in parallel with capacitor C3 is a Zener diode CR9. Thus, as well known to those skilled in the art of DC power supplies, the voltage at the common connection point of resistor R4, capacitor C3 and Zener diode CR9 is a "smooth" DC voltage, and Zener diode CR9 effectively "clamps" this voltage so that it will not exceed its reverse bias breakdown voltage. Referring to FIG. 1, the voltage at the common point between resistor R4 and Zener diode CR9 is the regulated DC voltage preferably 12 volts DC provided to power detection circuit 20; timer circuit 22; and switch 24.

Turning to detection circuit 20, full wave rectifier 74b, preferably sold by Fairchild under the designation IN 4148, preferably includes a pair of diodes CR6 and CR7 having common n regions and diodes CR5 and CR8 having common p regions; wherein the n regions of diodes CR5 and CR8 are respectively connected to the p regions of diodes CR6 and CR7; and wherein the secondary coil 72b is connected across the p regions of diodes CR6 and CR7. A series of negative pulses is produced at the connection point between diodes CR5 and CR8, and this series of negative pulses is directed through a resistor R5 to one side of a resistor R6, the other side of resistor R6 being held at 12 VDC by Zener regulator circuit 26. As described below, if negative pulses are not more or less continuously applied to resistor R6, delay device 16 will interrupt the power to computer 12 for a time sufficient to cause computer 12 to restart itself.

The terminal of resistor R6 connected to rectifier 74b is connected to ground through a parallel combination of a capacitor C4 and a reverse-biased diode CR10. For reasons which will be explained below, capacitor C4 may be termed the "pulse accumulating" capacitor in the circuit 20. The common terminal of resistor R6, capacitor C4 and diode CR10 are also connected to a resistor R8 which in turn is coupled to the base of a npn transistor Q2. The collector of transistor Q2 is connected to the regulated 12 volt DC power supply through a parallel combination of a reverse-biased diode CR11 and a resistor R7. Also, the collector of transistor Q2 is attached through capacitor C5 to ground, and the emitter of transistor Q2 is grounded as well.

Capacitor C5 is the component primarily responsible for extending or delaying momentary power outages so that computer 12 does not experience short-term outages which might cause it to operate using corrupted data, freeze-up, or otherwise become ineffective. Capacitor C5, the "timing capacitor" of timing circuit 22, is coupled to a standard 555 digital timing device U1 sold, for example, by National Semiconductor. Selected pins of this well-known circuit U1 are also coupled to ground and to the regulated 12 volt DC power supply in accordance with the pin designations set forth in FIG. 2. Timer U1 is operatively connected to an optical triac U2 through a series combination of a resistor R9 and a forward-biased light emitting diode DS2. Triac U2 is preferably a model MOC3010 sold by Motorola. The p region of the light emitting diode within photo triac U2 is also connected to timer U1 as shown in FIG. 2. Thus, in accordance with the well-known operation of timer U1, when the signal at pin 2 of timer U1 drops to one-third of VCC (12 volts), or 4 volts DC, the voltage at pin 3, where LED DS2 is connected, goes low, allowing the LED within photo triac U2 to become activated. The operation of timer 22 will be further described below.

Switch circuit 24 includes photo triac U2. As noted above, the LED of photo triac U2 is connected to timer U1. One leg of the triac of photo triac U2 is connected through a resistor R2 to the output plug or port 29 of delay device 16. The other leg of the triac of photo triac U2 is connected to the gate of a triac Q1, one leg of which is in effect connected to the input plug 27 of delay device 16 and the other leg of which is in effect connected to the output plug 29 of device 16. It can be seen that triac Q1 is thus the device which must remain activated to provide AC power to computer 12, and the device which, when deactivated, removes power from computer 12. A standard snubber circuit made up of a series combination of a capacitor C1 and a resistor R1 is connected across triac Q1. As is well known, this snubber circuit protects triac Q1 and filters out high frequency spikes which might tend to interact with the gate of triac Q1 to prematurely activate the triac or hold it in its "on" state for too long a time.

PREFERRED COMPONENTS OF DELAY UNIT 16

Delay unit 16 preferably includes components having the specifications given below. Capacitor values are in microfarads and resistor values are in ohm's, 5%, ¼W unless otherwise indicated.

| Component | Specification/Designation |
| --- | --- |
| Circuit Breaker 66 | 5 amp, magnetically actuated |
| MOV's 60, 62, 64 | 130 volts, |
| Transformer 68 | 120 VAC primary, 2 independent secondaries each at 10 VAC, .5 amps. |
| Transistor Q2 | npn, PN2222A |
| Triac Q1 | SC146M |

-continued

| Component | Specification/Designation |
| --- | --- |
| Resistor R9 | 470 |
| Resistor R8 | 9.1K |
| Resistor R7 | 1 meg ± 1%, ⅛ W |
| Resistor R6 | 75K |
| Resistor R5 | 2.4K |
| Resistor R4 | 75 ⅛ W |
| Resistor R3 | 1 K |
| Resistor R1, R2 | 100 |
| Capacitors C4, C5 | 4.7, 20%, 25 V |
| Capacitors C3, C6 | 0.1, +25%−10% 100 V |
| Capacitor C2 | 100, +100%−10% 50 V |
| Capacitor C1 | .005, 20%, 1000 V |
| Diode CR10 | IN270 |
| Diode, Zener, CR9 | IN4742A |
| Diodes, CR5, CR6, CR7, CR8, CR11 | IN414B |
| Diodes, CR1, CR2, CR3, CR4 | IN4002 |
| Photo triac U2 | MOC3010, 6 PIN |
| Integrated timer device U1 | 555, 8 PIN |

Operation

Having now described the preferred irrigation system 10, and in particular delay unit 16, the operation of same can be summarized. Sensors 15 and pumps and valves 14 are installed and connected to microcomputer 12. Microcomputer 12 and any peripheral equipment such as a monitor or printer are connected to outlet port 29 of delay unit 16 which in turn is attached to 115 VAC line voltage. Upon the initial application of power, Zener regulator circuit 26 begins to charge timer capacitor C5 through resistor R7 and the low voltage sensed at pin 2 of integrated circuit U1 causes its pin 3 to be high which in turn maintains the LED within photo triac U2 in its off state. Since the triac within photo triac U2 is thus not energized, triac Q1 is also not energized and power is not applied to the outlet plug or port 29 of delay unit 16.

In accordance with the operating characteristics of integrated circuit U1, when the voltage on timer capacitor C5 reaches two-thirds VCC, or 8 volts DC (assuming that Zener regulator circuit provides 12 VDC), the voltage on pin 3 will suddenly go low which will allow current to flow through the LED within photo triac U2. The light emanating from the LED energizes the triac within photo triac U2 which in turn activates triac Q1 to allow AC power to reach controller computer 12 and its related components. Circuit breaker 66 and MOV's 60, 62 and 64 provide over-current protection and noise and spike filtering, respectively. It should be noted that due to the characteristics of timer capacitor C5 and related resistor R7, it will take approximately five to seven seconds to charge capacitor C5 to two-thirds VCC, and thus at power on there will be a delay of approximately five to seven seconds between activation of delay unit 16 and energization of microcomputer 12.

Once triac Q1 is on and AC power is being continuously supplied through delay unit 16 to microcomputer 12, delay unit 16 merely acts as a circuit breaker/surge/noise suppressor, and does not otherwise affect the operation of the microcomputer 12 or the irrigation system. However, if one or more consecutive AC half cycles of AC power to delay unit 16 are lacking, this momentary AC power loss will in effect he delayed, extended or expanded by delay unit 16, as far as computer 12 is concerned, to at least a five to seven second power loss. As noted above, such a relatively long-term power outage to microcomputer 12 will cause it to restart; access or poll its input devices (clock, humidity sensors 15); and activate electromechanical components 14 as necessary.

When one or more consecutive AC half cycles are not present at the input port 27, full wave rectifier 74b will fail to provide corresponding negative pulses to the junction between resistors R6 and R8 in detection circuit 20. When this occurs, capacitor C4 will increase to approximately 0.8 volt (assuming VCC is 12 VDC) at which time transistor Q2 becomes forward-biased and turns on. Once transistor Q2 is so activated, the voltage on timing capacitor C5 immediately drops, and when it reaches one-third VCC, as sensed at pin 2 of integrated circuit U1, pin 3 is switched from its low to its high state (VCC), which prevents the flow of current through the LED within photo triac U2 which ultimately turns off triac Q1 and prevents the flow of AC current through delay device 16.

Once AC power to delay circuit 16 is resumed, secondary winding 72b and full wave rectifier 74b act in concert to again supply negative pulses to capacitor C4 to reduce its voltage to roughly 0.6 VDC which is insufficient voltage to forward bias transistor Q2 and thus timing capacitor C5 begins to recharge, through resistor R7, to VCC. It will take approximately five to seven seconds for timing capacitor C5 to recharge to the point where integrated timer U1 will activate photo triac U2 to ultimately allow AC current to flow to computer 12. Thus delay unit 16 extends or delays any loss of AC power lasting for at least about two half cycles of AC (about 0.016 second) so that the AC power loss experienced by microcomputer 12 last at least five to seven seconds.

It should again be emphasized that the present invention is not limited to the particular circuit or circuit components discussed above. Further, a "delay unit" according to the invention could be used to accommodate disturbances other than momentary power losses, e.g., momentary surges. Accordingly, the scope of the present invention is to be limited only by the appended claims.

I claim:
1. A delay apparatus comprising:
  (a) means for detecting a momentary loss of electrical power being supplied to a computer device and producing a power disturbance signal in response thereto; and
  (b) means responsive to the power disturbance signal for interrupting the electrical power being supplied to the computer device for at least a preselected period of time, wherein:
    (i) following the momentary power loss, electric power is supplied to the computer device after the preselected period of time; and
    (ii) the momentary power loss lasts at least about 0.008 second and the preselected period of time is at least about five to seven seconds, whereby the delay apparatus converts the momentary power loss to a relatively long-term power loss lasting for at least about five to seven seconds, and the computer device will experience the relatively long-term power loss rather than the momentary power loss and will restart itself.
2. The delay apparatus of claim 1, wherein the interrupting means comprises:
  (a) switch means having an open state and a closed state for interrupting the electrical power being supplied to the computer device; and
  (b) timing means operatively connected to the switch means and responsive to the power disturbance signal for maintaining the switch means in its open state for the preselected period of time.
3. The delay apparatus of claim 2, wherein the electrical power being supplied to the computer device is AC and wherein the switch means comprises a triac.
4. The delay apparatus of claim 1 wherein the electrical power being supplied to the computer device is AC, comprising an AC power signal, and wherein the detecting means comprises:
  (a) means for producing a pulse signal for each half wave of the AC power signal supplied to the delay apparatus; and
  (b) charge storage means in operative contact with the pulse signal producing means, wherein when the momentary loss of AC power occurs the pulse signal producing means will not produce pulse signals and the charge on the charge storage means changes, thereby causing the power disturbance signal to be produced.
5. The delay apparatus of claim 4, wherein the charge storage means comprises a pulse accumulating capacitor and the detecting means further comprises a transistor in operative contact with the pulse accumulating capacitor, wherein the conductive state of the transistor changes when the pulse accumulating capacitor is not supplied with a continuous series of pulses, and wherein the conductive state of the transistor affects the state of the power disturbance signal.
6. The delay apparatus of claim 5, further comprising a timing capacitor in operative contact with the transistor, wherein the charge on the timing capacitor begins to change when the transistor changes state, and when the charge on the timing capacitor reaches a predetermined level the power disturbance signal is produced.
7. The delay apparatus of claim 6, further comprising an integrated device in operative contact with the timing capacitor for monitoring the level of charge on the timing capacitor and for producing or removing the power disturbance signal depending on the level of charge on the timing capacitor.
8. The delay apparatus of claim 7, wherein the momentary loss of AC power is about one AC cycle long.
9. The delay apparatus of claim 1, further comprising a circuit breaker and a filter suitable for providing over-current, noise and spike protection.
10. A delay apparatus comprising:
  (a) means for detecting a momentary loss of AC power being supplied to a computer device and producing a power disturbance signal in response thereto, comprising:
    (i) a full wave rectivfier for producing a pulse signal for each half wave of the AC power signal supplied to the delay apparatus and the computer device;
    (ii) a pulse accumulating capacitor in operative contact with the full wave rectifier; and
    (iii) a transistor in operative contact with the pulse accumulating capacitor suitable for producing a power disturbance signal;
  (b) a triac having an open state and a closed state for interrupting the electrical power being supplied to the computer device;

(c) a timing capacitor in operative contact with the transistor; and (d) an integrated timer in operative contact with the timing capacitor and the triac, wherein when AC power is present and substantially continuous the full wave rectifier provides pulses which maintain the charge on the pulse accumulating capacitor such that the conductive state of the transistor maintains the timing capacitor in a continuous charged state which causes the integrated timer to activate the triac, but when there is a momentary loss of AC power to the delay apparatus lasting at least about 0.008 second the charge on the pulse accumulating capacitor changes which in turn changes the conductive state of the transistor to discharge the timing capacitor, which in turn causes the integrated timer to deactivate the triac, wherein following resumption of AC power it takes about five to seven seconds to charge the timing capacitor to the point where the integrated timer will activate the triac, whereby the delay apparatus converts the momentary power loss to a relatively long-term power loss lasting at least about five to seven seconds, whereby the computer device will experience the relatively long-term power loss rather than the momentary power loss and will restart itself.

11. A control system comprising:
(a) a computer control device; and
(b) a delay apparatus connected between the computer control device and its electrical power supply, comprising:
   (i) means for detecting a momentary interruption lasting at least about 0.008 second in the electrical power being supplied to the computer control device and producing a power disturbance signal in response thereto; and
   (ii) means responsive to the power disturbance signal for interrupting the electrical power being supplied to the computer control device to a preselected period of time which is at least about five to seven seconds, whereby the computer control device is not subjected to power interruptions of shorter duration than the preselected period of time, and the computer control device of the control system will be allowed to restart itself after the preselected period of time.

12. A method for preventing a computer device from experiencing a short-term power interruption of between about 0.008 second and about five to seven seconds, comprising:
(a) monitoring the electrical supply;
(b) producing a power disturbance signal when an interruption of more than about 0.008 second is detected; and
(c) responding to the power disturbance signal by immediately interrupting the electrical supply to the computer device for a preselected period of time of at least about five to seven seconds, whereby the computer device is not subjected to the short-term interruption but instead experiences a loss of power lasting at least the preselected period of time.

13. An irrigation system comprising:
(A) a computer control device;
(B) a delay apparatus connected between the computer control device and its AC power supply; and
(C) a plurality of water valves operatively connected to the computer control device, wherein the delay apparatus comprises:
   (1) means for detecting a momentary loss of electrical power being supplied to the computer control device and producing a power disturbance signal in response thereto; and
   (2) means responsive to the power disturbance signal for interrupting the electrical power being supplied to the computer control device for at least a preselected period of time, wherein:
      (a) following the momentary power loss, electric power is supplied to the computer control device after the preselected period of time; and
      (b) the momentary power loss lasts at least about 0.008 second and the preselected period of time is at least about five to seven seconds, whereby the delay apparatus converts the momentary power loss to a relatively long-term power loss lasting for at least about five to seven seconds, and the computer control device will experience the relatively long-term power loss rather than the momentary power loss and will restart itself.

* * * * *